United States Patent [19]

Mercy

[11] Patent Number: 4,556,948
[45] Date of Patent: Dec. 3, 1985

[54] MULTIPLIER SPEED IMPROVEMENT BY SKIPPING CARRY SAVE ADDERS

[75] Inventor: Brian R. Mercy, Warrenton, Va.

[73] Assignee: International Business Machines Corporation, Armonk, N.Y.

[21] Appl. No.: 449,924

[22] Filed: Dec. 15, 1982

[51] Int. Cl.[4] .............................................. G06F 7/52
[52] U.S. Cl. ..................................... 364/757; 364/786
[58] Field of Search ............... 364/757, 758, 759, 760, 364/786

[56] References Cited

U.S. PATENT DOCUMENTS

| 3,515,344 | 6/1970 | Goldschmidt et al. | 364/758 |
| 3,761,698 | 9/1973 | Stephenson | 364/757 |
| 4,052,604 | 10/1977 | Maitland et al. | 364/786 |
| 4,218,747 | 8/1980 | Miura | 364/716 |

OTHER PUBLICATIONS

Wallace, "A Suggestion for a Fast Multiplier", *IEEE Trans. on Electronic Computers*, Feb. 1964, pp. 14–17.
Partridge, "Cascade Adder for Multiply Operations", *IBM Tech. Disclosure Bulletin*, vol. 13, No. 8, Jan. 1971, pp. 2406–2407.
Lai et al, "Logic Networks of Carry-Save Adders", *IEEE Trans. on Computers*, vol. C-31, No. 9, Sep. 1982, pp. 870–882.
J. P. Beraud, "High Speed Four-Bit Adder", IBM TDB, 5/1974, p. 3950.

Primary Examiner—David H. Malzahn
Attorney, Agent, or Firm—John E. Hoel

[57] ABSTRACT

A complement carry technique and a staged skipping technique are employed for multipliers using four or more stages of carry save adders, to allow slower bits to skip past a stage while faster bits must go through that stage, thereby speeding up the multiplier's overall speed of operation. The complement carry technique minimizes hardware by allowing sums and carries to be generated by the carry save adders in either a true or a complement form. The skip technique takes advantage of the fact that the generation of a carry bit is faster than the generation of a sum bit. In the case of a four stage carry save adder designed for a multiplier, the skip technique reduces the number of circuit delays from the existing eight to the improved seven, without the addition of any hardware. Thus, the technique can result in a speed improvement for a multiplier.

5 Claims, 8 Drawing Figures

COMPLEMENTED
CARRY GENERATION
WITH SINGLE CIRCUIT-DELAY

SUM GENERATION
WITH TWO
CIRCUIT-DELAYS

CARRY SAVE
ADDER FOR A1-A5
AND A7

CARRY SAVE ADDER
FOR A6

CARRY GENERATION
CIRCUIT

PARTIAL PRODUCT ADDER
FOR 16 BIT MULTIPLIER 4,556,948

MULTIPLIER SPEED IMPROVEMENT BY SKIPPING CARRY SAVE ADDERS

FIELD OF THE INVENTION

The invention disclosed broadly relates to digital circuitry and more particularly relates to improvements in digital multipliers.

BACKGROUND OF THE INVENTION

In the classical multiplier architecture, the multiplier operand and the multiplicand operand are input to partial product generators. For example, if each operand is eight binary bits long, then eight partial products will be produced by the partial product generators. The partial products must then be added to produce the final product in the multiplier. Prior art multiplier designs use conventional carry save adders in an arrangement such as is shown in FIG. 1 for the addition of a single binary bit position for eight partial products. There can be as many as 16 single bit columns such as that shown in FIG. 1, required to complete the necessary additions of the partial products in an eight by eight multiplier. The term carry save adder is used herein to refer to a one bit logic block which adds an augend bit, an addend bit, and a carry bit and produces a resultant sum bit and carry bit. The one bit carry save adders A1', A2', A3', A4', A5', A6' and A7' in FIG. 1 employ the classical approach to forming the sum as is shown in equation 1a and to form the carry bit as is shown in equation 3. As is seen in equations 1a and 3, only true values for the sums and carries are produced and propagated from one level of carry save adders to the next. For example, as is shown for bit column N in FIG. 1, the adder A4' receives a true sum S11 from the adder A1', a true sum S21 from the adder A2', and a true sum S31 from the adder A3'. Those three sums are added in the adder A4' to produce a true sum S41 and a true carry C41.

A conventional carry save adder such as A4' in FIG. 1 has a sum generation circuit as shown in FIG. 4, which generates a true sum by applying the first two operands, for example A and B to a first exclusive OR circuit 23 and then the output of that first exclusive OR circuit is applied as a first input to a second exclusive OR circuit 30, the other input to the second exclusive OR circuit being the third operand C. The output of the second exclusive OR circuit is then the sum. This operation requires two delay intervals to accomplish. The operands A, B and C in FIG. 4 correspond to the operands S11, S21 and S31 for the adder A4' in FIG. 1.

The carry generation operation for a conventional carry save adder such as A4' in FIG. 1 would apply the three operand inputs S11, S21 and S31 in respective pairs to each of three AND gates, the outputs of which are OR'ed together to provide the true carry output C41. This operation also requires two logic delay intervals to accomplish. Even if the sum and carry operations were to be performed in parallel, the two gate delay limitation is the minimum time required for each carry save adder stage in the multiplier of FIG. 1 to complete generating a true valued carry. Since multipliers generally have four or more carry save adder stages to carry out the addition of the partial products, this limitation in the amount of delay required to generate sum bits and carry bits imposes a significant overall limitation in the multiplier operation.

OBJECTS OF THE INVENTION

It is therefore an object of the invention to provide an improved multiplier.

It is a further object of the invention to improve the speed of operation of a digital multiplier.

It is another object of the invention to reduce the number of gate delays in adding partial products in a digital multiplier.

It is yet a further object of the invention to reduce the number of power dissipating circuit elements in a digital multiplier.

It is still a further object of the invention to reduce the area occupied by a multiplier embodied in an integrated circuit chip.

SUMMARY OF THE INVENTION

These and other objects, features and advantages of the invention are accomplished by the multiplier disclosed herein. A complement carry technique and a stage skipping technique are employed for multipliers using four or more stages of carry save adders, to allow slower bits to skip past a stage while faster bits must go through that stage, thereby speeding up the multiplier's overall speed of operation. The complement carry technique minimizes hardware by allowing sums and carries to be generated by the carry save adders in either a true or a complement form. The skip technique takes advantage of the fact that the generation of a complement carry bit is faster than the generation of a sum bit. In the case of a four stage carry save adder designed for a multiplier, the skip technique reduces the number of circuit delays from the existing eight to the improved seven, without the addition of any hardware. Thus, the technique can result in a significant speed improvement for the multiplier. In addition, a number of power dissipating inverter circuits can be removed from a multiplier designed in accordance with the invention. A circuit of the complexity of an eight bit multiplier would normally require approximately 1200 equivalent NOR logic gates, but by applying the principle of the invention disclosed herein, a savings of approximately 50 NOR logic gates can be achieved. This reduces the overall power dissipation for this circuit and reduces the area occupied by the circuit, while retaining the same multiply function.

DESCRIPTION OF THE FIGURES

These and other objects, features and advantages of the invention will be more fully appreciated with reference to the accompanying figures.

DISCUSSION OF THE PREFERRED EMBODIMENT

A complement carry technique and a stage skipping technique are employed for multipliers using four or more stages of carry save adders, to allow slower bits to skip past a stage while faster bits must go through that stage, thereby speeding up the multiplier's overall speed of operation. The complement carry technique allows sums and carries to be generated by the carry save adders in either a true or a complement form, thereby minimizing hardware by eliminating the need for inverters which were previously used to provide true carry outputs. The skip technique takes advantage of the fact that the generation of a complement carry bit is faster than the generation of a sum bit. In the case of a four stage carry save adder designed for a multiplier, the skip technique reduces the number of circuit delays from the existing eight to the improved seven, without the addition of any hardware. Thus, the technique can result in a significant speed improvement for the multiplier.

One aspect of the invention is the removal of inverter circuits from the conventional form of the carry generation circuit in the carry save adders which add the partial products in a multiplier. The inverter circuits do no more in the conventional carry save adder than take the complement value of the carry and make it true before outputting it from the carry save adder. By providing a carry generation circuit such as is shown in the logic block diagram of FIG. 3, two-input AND gates 20, 22, and 24 can each respectively receive a pair of the three binary bit inputs representing an augend, an addend, and a carry bit from the preceding, lower order column. In a conventional carry generation circuit, FET inverting logic is used so that the outputs of the respective AND gates 20, 22 and 24 is actually the NAND logical function and that output binary value must be inverted by a separate inverter in order to obtain the true carry bit. By removing the necessity for using true carries in the arithmetic operations of adding the partial products in the multiplier, this extra inverter circuit can be eliminated and the output from the NAND circuit providing the complemented carry value can be immediately applied to the succeeding stage in the partial product addition logic.

Figure 1:
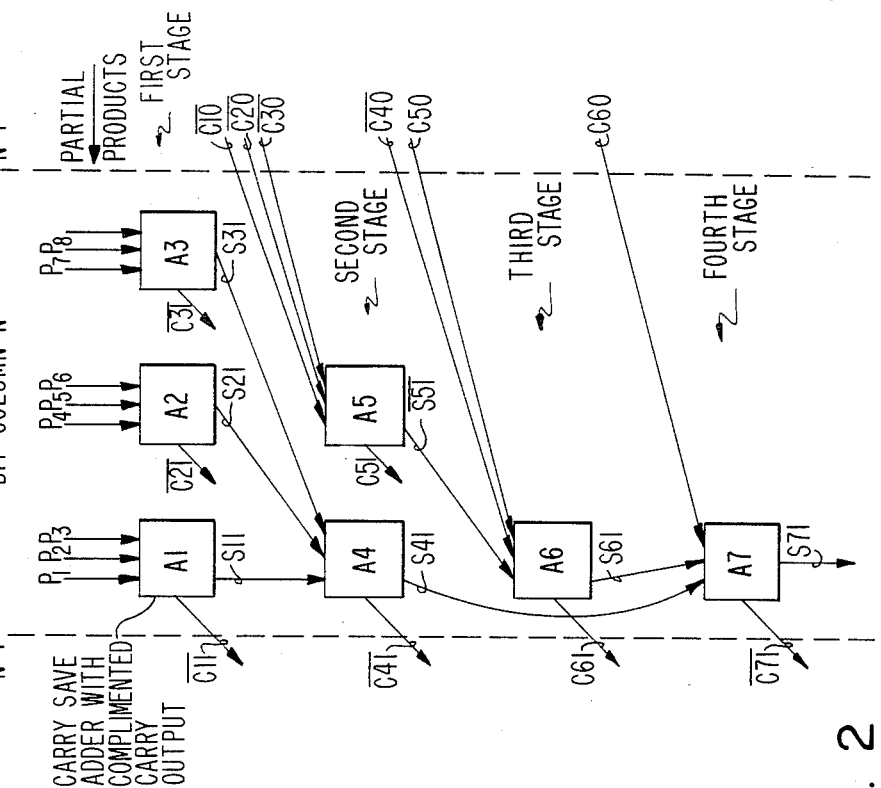
FIG. 1 is a functional block diagram of one bit column in the partial product adder of a classical eight bit multiplier organization.
Figure 2:
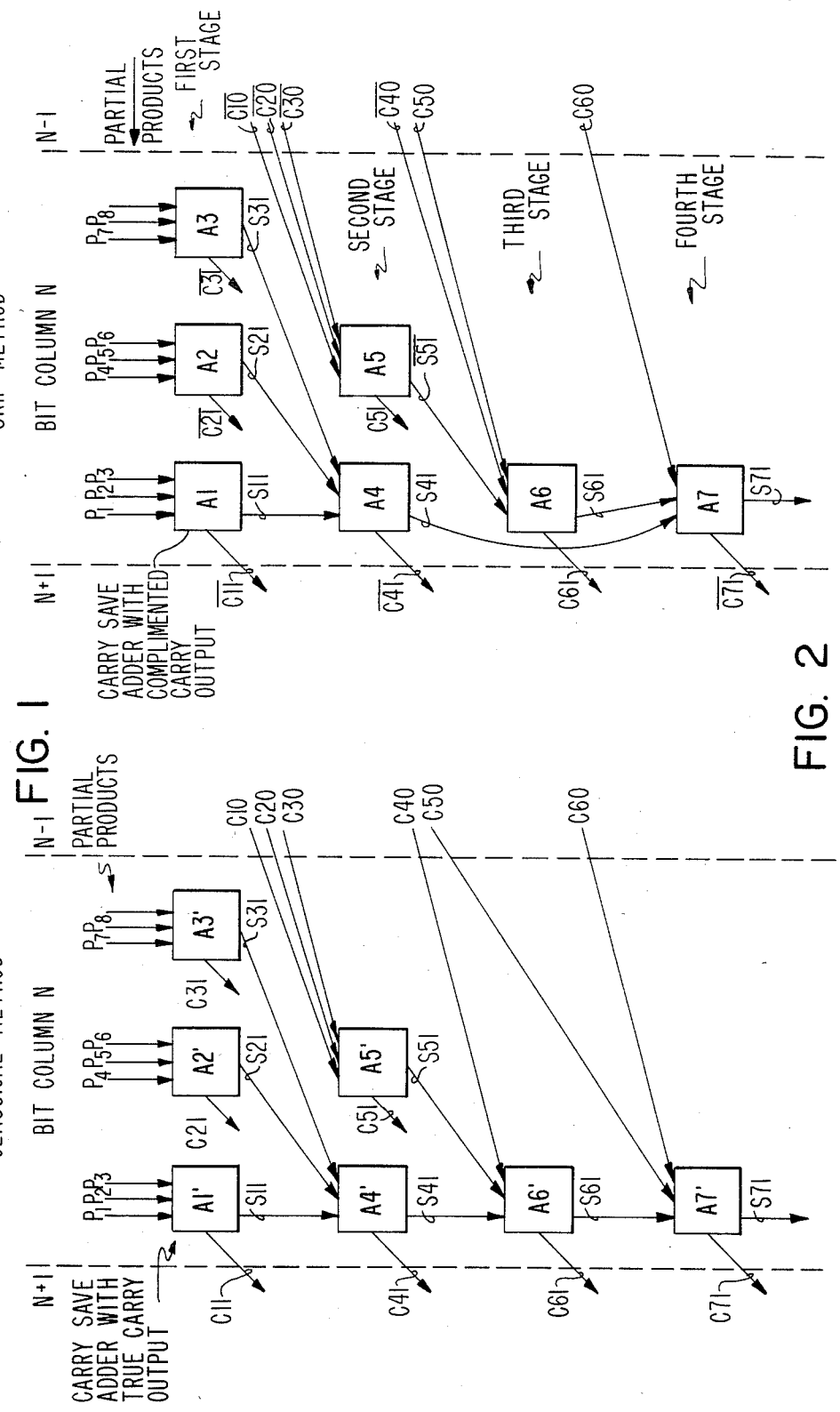
FIG. 2 is a functional block diagram of one bit column in the partial product adder of an eight bit multiplier organized in accordance with the principles of the invention.
Figure 3:
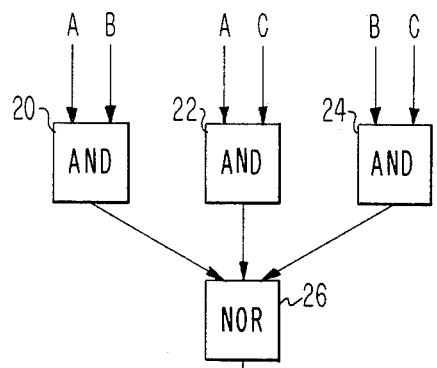
FIG. 3 is a logic diagram of the logic function to provide a one bit complement carry output for the addition of three one bit operands.
Figure 5:
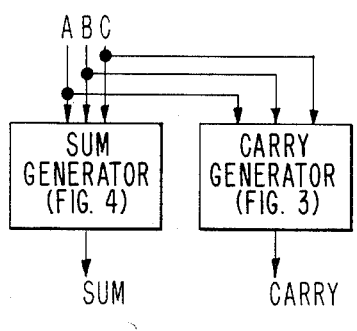
FIG. 5 is a functional block diagram of one of the carry save adders A1 to A5 or A7 of FIG. 2.
Figure 7:
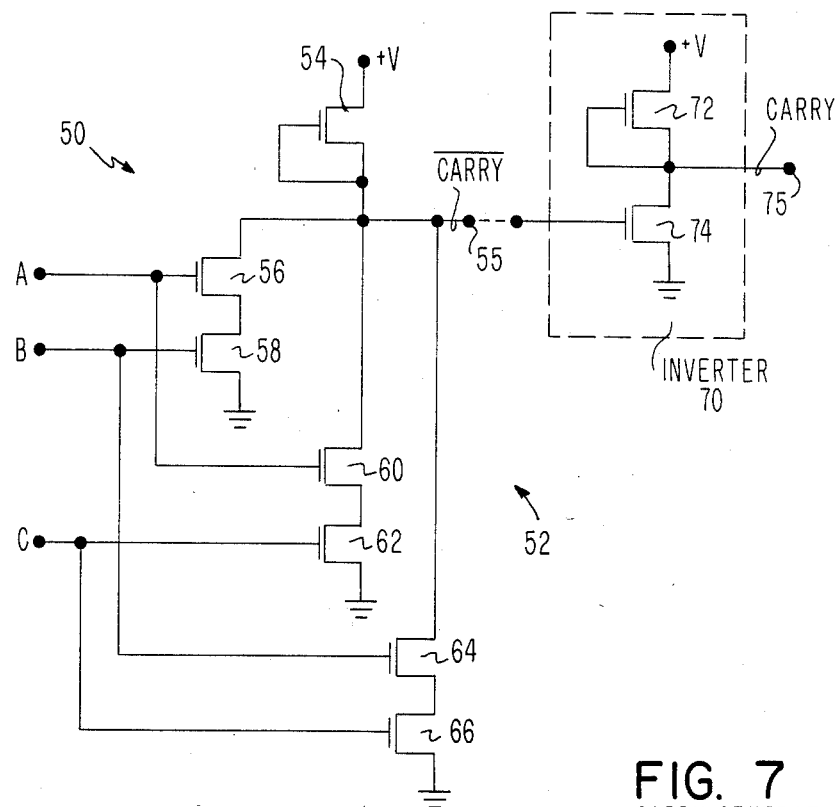
FIG. 7 is a circuit diagram of an FET carry generation circuit.

More specifically, reference is here made to FIG. 7 which shows an electrical schematic diagram of an AND/OR invert logic function 50 and an inverter circuit 70 in the carry circuit 52, as embodied in FET circuitry. In conventional carry generation circuitry, the complete circuit 52 shown in FIG. 7 must be employed, comprising both the AND/OR invert portion 50 and the inverter portion 70. The AND/OR invert portion 50 includes the FET load device 54 connected to the output node 55, a first series connected pair of transistors 56 and 58, a second series connected pair of transistors 60 and 62, and a third series connected pair of transistors 64 and 66, all of which are connected in parallel to the node 55. As is seen in FIG. 7, by applying the binary values for the addend A, the augend B, and the carry bit C as shown, the complemented carry value is output at the node 55. In conventional carry generation circuits, the complemented carry values cannot be used and therefore the output at node 55 must be inverted through the inverter 70 which comprises the load device 72 and active device 74 so that a true carry can be output at the node 75. This is the situation with prior art partial product addition circuits used in conventional multipliers, as shown in FIG. 1. It is one aspect of the invention herein to make use of the complemented carry output at the node 55 of an AND/OR invert circuit 50 which can be directly applied to the inputs of carry save adders in subsequent stages of the partial product additional logic, as is shown in FIGS. 2 and 5. This enables the elimination of the inverter circuits 70 for each carry generation circuit 52 as is shown in FIG. 3, thereby reducing the size, power dissipation, and propagation time for the generation of the resultant partial product sum.

In still another aspect of the invention, advantage is taken of the faster propagation time for the generation of complemented carries in the partial product adder, by allowing some stages in the partial product adder to be skipped in the processing of the partial product addition. This is shown to advantage with the output S41 from the adder A4 in FIG. 2 which skips around the next stage adder A6. This will be discussed further in the following sections.

The invention addresses the question as to what happens if you do not recomplement the complemented carry outputs from the AND/OR invert circuits in carry generation logic of a multiplier. If the carry bit were left complemented, can complemented carries and true sum bits be successfully added in a multiplier? The conventional logic equation for generating a sum bit is shown in equation 1a and the conventional logic equation for generating a carry bit is shown in equation 3.

| Equations | | | | | | |
|---|---|---|---|---|---|---|
| 1(a). | sum | = | $A$ | XOR $B$ | XOR $C$ |
| 1(b). | sum | = | $\overline{A}$ | XOR $\overline{B}$ | XOR $C$ |
| 1(c). | sum | = | $A$ | XOR $\overline{B}$ | XOR $\overline{C}$ |
| 1(d). | sum | = | $\overline{A}$ | XOR $B$ | XOR $\overline{C}$ |
| 2(a). | $\overline{sum}$ | = | $\overline{A}$ | XOR $\overline{B}$ | XOR $\overline{C}$ |
| 2(b). | $\overline{sum}$ | = | $\overline{A}$ | XOR $B$ | XOR $C$ |
| 2(c). | $\overline{sum}$ | = | $A$ | XOR $\overline{B}$ | XOR $C$ |
| 2(d). | $\overline{sum}$ | = | $A$ | XOR $B$ | XOR $\overline{C}$ |
| 3. | carry | = | $AB$ | + $BC$ | + $AC$ |
| 4. | $\overline{carry}$ | = | $\overline{A}\,\overline{B}$ | + $\overline{B}\,\overline{C}$ | + $\overline{A}\,\overline{C}$ |

The invention makes use of the alternate and the equivalent logical equations 1b, 1c and 1d for the generation of a sum bit and the additional equations 2a through 2d for the generation of a complemented sum bit and still further the equation 4 for the generation of a complemented carry bit. These equations show that one can successfully add complemented carries and true sums or complemented sums and true carries or complemented sums and complemented carries so as to obtain useful results in a multiplier. The equations show that if an odd number of inputs to the carry save adder of FIG. 5 are true, then the sum will also be true. Equations 2a through 2d show that when an even number of inputs to the summation circuit are true, a complemented sum will be generated. Equation 4 shows how complemented signals input to a carry generation circuit will operate. A correct complemented carry bit will be generated if all input signals to the carry generation circuit are complemented. Thus it is seen from equations 1a through 1d, 2a through 2d, 3 and 4, that a mixture of true and complemented values for the augend, addend, and carry signals can be applied to the inputs of the full adders of a partial product addition logic in a multiplier, and a valid output can be obtained.

Figure 4:
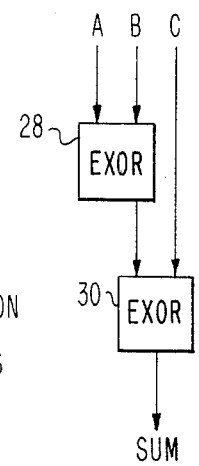
FIG. 4 is a logic diagram of the summing circuit for three one bit operands to generate a one bit sum.
Figure 6:
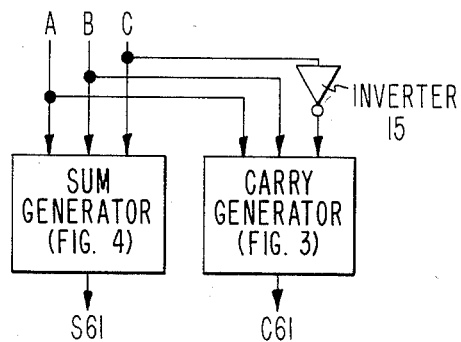
FIG. 6 is a functional block diagram of the carry save adder A6 of FIG. 2.

Referring now to FIG. 2, which shows the partial product adder in a multiplier, this principle of employing complementing carry outputs from the respective adder stages is applied in accordance with the equations discussed above. Adders A1, A2, A3, A4, A5 and A7 are schematically shown in FIG. 5 and the adder A6 is schematically shown in FIG. 6. Each adder is made up of a complemented carry generator of FIG. 3 and a sum generator of FIG. 4. The complemented carry generator of FIG. 3 is the same as the AND/OR invert 50 of FIG. 7, but is represented by the AND logic symbols 20, 22 and 24 and the NOR logic symbol 26. The sum generator of FIG. 4 is of the conventional design with two exclusive OR logic functions 28 and 30. The adder A6 shown in FIG. 6 employs an additional inverter 15 for the true value carry input C50 so that the complemented value is applied to the carry generator as illustrated in FIG. 6. This is done in order to assure that all three binary values applied to the carry generator circuit of FIG. 6 are complemented, as is required in equation 4.

It can be seen with reference to FIG. 2 that another aspect of the invention is to allow the outputs of some stages such as the sum output S41 of adder 4, to skip the next stage A6, because of the unequal speed of the sum and carry generation through each carry save adder. It requires two circuit delays to generate a sum but only a single circuit delay to generate a carry. By analyzing the flow of information bits through the logic tree of adders A1 through A7 shown in FIG. 2, the sum bits and carry bits can be combined in such a way that advantage can be taken of the fact that the complement carry bits are generated faster than the sum bits. Thus, the sum bit S4 output from the adder A4 can be allowed to skip the stage containing the next adder A6 and be input directly to the adder A7, and yet will arrive at the input to the adder A7 at or before the time of arrival of the sum bit S61 from the adder A6. This is because of the arrangement of faster carry bits $\overline{C40}$ and $\overline{C50}$ which are applied to the input of the adder A6 and because of the faster generation of the carry bits $\overline{C10}$, $\overline{C20}$ and $\overline{C30}$ which are applied to the inputs of the adder A5 to generate the sum bit $\overline{S51}$ which is, in turn applied to the input of the adder A6. This stage skipping feature provides a significant speed advantage to the partial product adder in a multiplier.

Referring to the circuit in FIG. 2, the slowest logic path starts out with a partial product P1 which is input to the adder A1 and produces a carry $\overline{C11}$ which is applied to the next higher column in the multiplier. The corresponding input to the bit column N of the adder circuit shown in FIG. 2 is $\overline{C10}$. There is one circuit delay required to generate $\overline{C10}$ from the partial product P1. $\overline{C10}$ is then applied to the adder A5 which outputs a complemented sum $\overline{S51}$ after two circuit delays. Thus, the complemented sum $\overline{S51}$ is generated three circuit delays following the application of partial products P1 to the first stage adders. The complemented sum $\overline{S51}$ output from the adder A5 is input to the adder A6 which produces a true sum output S61 after an additional two circuit delays. Thus S61 is produced a full five circuit delays after the initial application of the partial product P1 to the adder A1 in the first stage (of the column N−1). The output of the adder A7 of the true sum S71 requires an additional two circuit delays, for a total longest circuit delay for S71 of seven circuit delay intervals. Recall that the sum S61 arrives at the input of the adder A7 after five circuit delays. Note that the sum S41 output from the adder A4 and directly input to the adder A7, is produced four circuit delays after the application of the input P1 to the adder A1. Thus it is seen that by taking advantage of a faster propagation of carries in the adder arrangement, the sum S41 can be allowed to skip the stage occupied by the adder A6. Also note that without this stage skipping technique, the classical method of adding in FIG. 1 results in a full eight circuit delays before the resultant true sum S71 was produced. Thus, for the partial product adder portion of the multiplier circuit of FIG. 2, it is approximately 13 percent faster than the circuit of FIG. 1, for just four stages of adder. In the largest adder architectures, the percentage savings would be even greater because additional stages could be skipped.

The functional block diagram of FIG. 2 represents a single bit column in what may be a multiplier having M bit columns, multiplying a multiplicand of M binary bits times the multiplier of M binary bits. Each single bit column of the multiplier would include a partial product generator which would provide R outputs (in an eight bit multiplier there would be eight outputs) which are the partial products P1 through P8 shown as inputs to the respective carry save adders A1, A2 and A3 in FIG. 2.

Without the provision of providing a complement carry at successive stages in the multiplier and making use of this complement carry feature to skip the carry save adder A6 in the multiplier of FIG. 2, a full eight delay intervals would have been incurred in the production of the sum bit output from the carry save adder A7. Thus it is seen that the overall speed of the multiplier in FIG. 2 is increased by reducing the cumulative delay intervals of the sum bit with respect to those for the complemented carry bit output of the multiplier.

EXAMPLE OF THE OPERATION

Reference can be made to Table 1 which follows, to illustrate the operation of the carry save adders in FIG. 2 which have complement carry outputs in multiplying an eight bit multiplicand 00010001 (having a magnitude of 17) times an eight bit multiplier 00001001 (having a magnitude of 9) Section 1 of Table 1 illustrates the operation of the carry save adders A1, A2 and A3. Section 2 of Table 1 illustrates the operation of the carry save adders A4 and A5. Section 3 of Table 1 illustrates the operation of the carry save adder A6. And Section 4 of Table 1 illustrates the operation of the carry save adder A7. The sum S71 of the carry save adder A7 is added to the carry $\overline{C70}$ from the bit column N−1 in a carry propagate adder (CPA) as shown in Section 5 of Table 1, to yield the eight bit binary value 10011001 (having a magnitude of 153) which is the expected value for the product of the multiplier and the multiplicand.

Table 1 has five columns. Column 1 has the name of each circuit, e.g. A1, A2. Column 2 is the name of the input signal to each circuit. Column 3 is the data value of the input signal. Column 4 is the name of the output signal for each circuit and column 5 is the data value of the output signal. The example is the multiplication of two eight-bit unsigned binary numbers which creates eight partial products P1 to P8. That partial product array will have been created by a number of AND gates in the conventional manner. There are a number of ways to create the partial product which are input to the invention.

The correct answer for this example is 153 and that number is shown in binary in section 5. The partial product array for the example has eight binary numbers and they are arranged one on top of the other. These numbers are given the names of P1 through P8. The objective of the first stage of the design is to add these eight values and to create six new values. The circuits A1, A2 and A3 add these eight values (values P1 through P8) and create six new values S1, S2 and S3 and $\overline{C1}$, $\overline{C2}$ and $\overline{C3}$. The P1 through P8 values are shown in Section 1 of the table. The S1, S2 and S3 values and $\overline{C1}$, $\overline{C2}$ and $\overline{C3}$ values are shown in Section 2 of the table. In the example, there is a binary pattern in S1, S2 and S3 which are all zeros. $\overline{C1}$ is a complement of a zero pattern as is $\overline{C2}$ and as is $\overline{C3}$. Section 3 of the table shows the values $\overline{S5}$, $\overline{C4}$ and $\overline{C5}$. $\overline{S5}$ will be all ones, $\overline{C4}$ will be all ones and C5 will be all zeros. The number at this time is not in the A6 circuit in Section 3 of the example. The actual answer has taken the S4 path and it will appear down in the next section. In the fourth section, the correct answer is S4. S6 has a pattern of all zeros and C6 has a pattern of all zeros. The output of this section is S7 which has the correct answer and $\overline{C7}$ which is all ones. Those two values represent the completion of the partial product addition, but that is not the completion of the multiplication operation. The two values S7 and $\overline{C7}$ must be added in the proper way in order to get the final answer. The very last portion of the table shows these two values being added. First, $\overline{C7}$ is complemented to create a C7. Then S7 and C7 are added in the normal, classical binary method and then the correct binary answer results, the value 153.

The invention is not limited to an eight by eight multiplication. It applies to all multipliers of eight by eight or greater. The only requirement for the design to work is to have eight or more partial products to be added. If there are more than eight partial products, there is the advantage that not only will additional circuits be saved, but additional speed benefits accrue by allowing the skip technique to occur more than once in each bit column.

Figure 8:
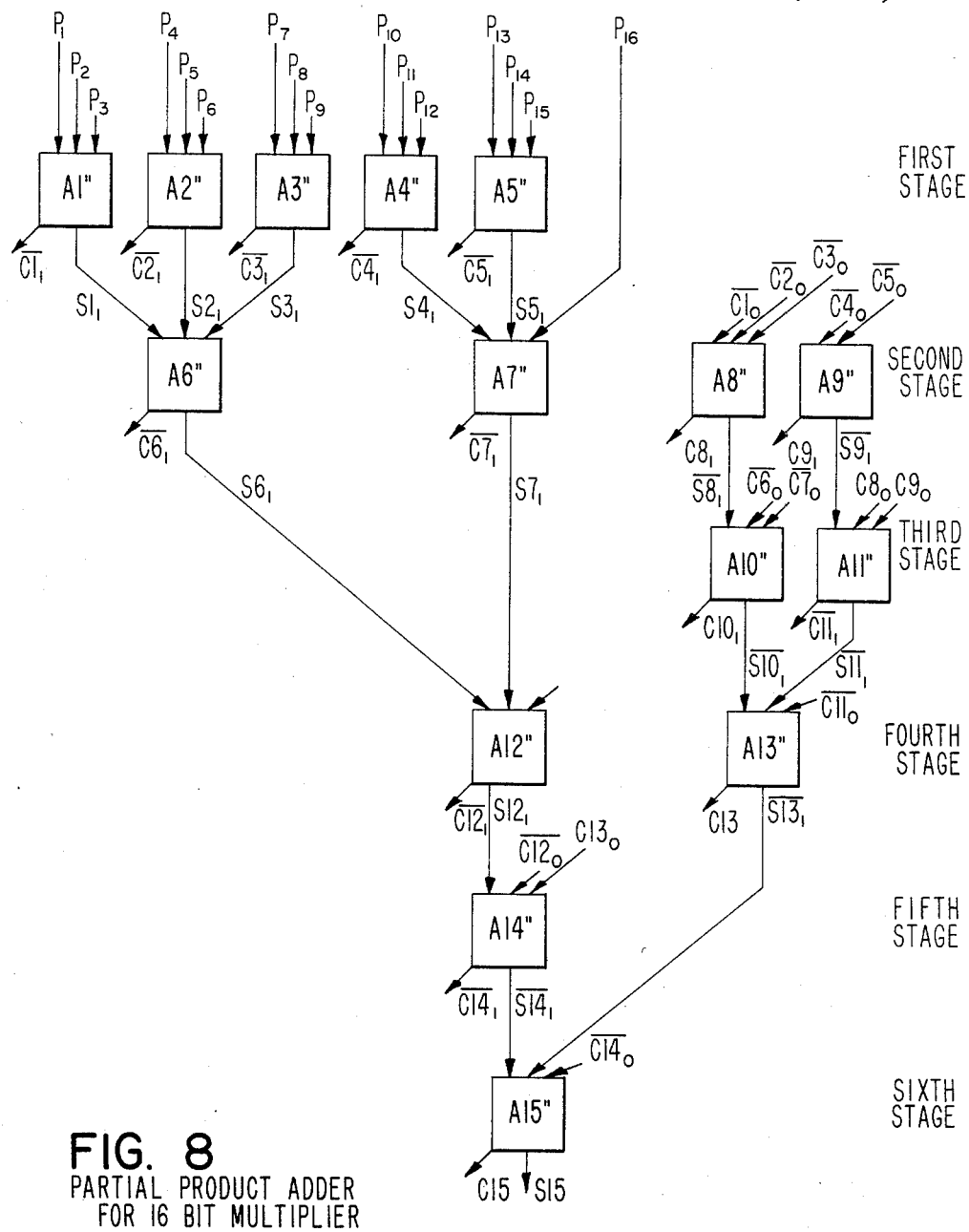
FIG. 8 is a functional block diagram of one bit column in the partial product adder of a 16 bit multiplier organized in accordance with the principles of the invention.

FIG. 8 is a functional block diagram of one bit column in the partial product adder of a 16 bit multiplier organized in accordance with the principles of the invention. Sixteen partial products P1 through P16 are input to the bit column N, along with carry bits from the preceding lower order N−1 column, to obtain the resultant sum bit S15 and carry bit C15 for the 16 partial product bits, which will be added by a carry propagate adder to achieve the final product of the multiplication operation. In a manner similar to the organization of the eight bit multiplier in FIG. 2, the 16 bit multiplier of FIG. 8 employs carry save adders A1″, etc. which produce a complement carry output $\overline{C11}$, etc. which are produced faster than true carries would be, thereby allowing two stages to be skipped, as described hereinafter.

The partial product adder for a 16 bit multiplier shown in FIG. 8 has complemented carry save adders A1″ to A8″, A10″ to A13″ and A15″ which have the organization shown in the logic diagram of FIG. 5. The complemented carry save adders A11″ and A14″ have the organization shown in the logic diagram of FIG. 6. The complemented carry save adder A9″ adds only two operands $\overline{C40}$ and $\overline{C50}$ and has the organization of a single exclusive OR to provide the sum $\overline{S91}$ and a two input NAND to provide the carry C91.

In an organization similar in principle to that shown for the eight bit multiplier in FIG. 2, the 16 bit multiplier embodiment of FIG. 8 has the carry save adder A1″ receiving the partial product bits P1, P2 and P3 and producing the complemented carry bit $\overline{C11}$ and the true sum bit S11. In a similar manner, the carry save adder A2″ receives the partial product bits P4, P5 and P6 and produces the complemented carry $\overline{C21}$ and the true sum S21. The carry save adder A3″ receives the partial products P7, P8 and P9 and produces the complemented carry output $\overline{C31}$ and the true sum S31. The complemented carries $\overline{C11}$, $\overline{C21}$ and $\overline{C31}$ are transferred to the next higher order bit column N+1 and the corresponding carry bits $\overline{C10}$, $\overline{C20}$ and $\overline{C30}$ are received by the carry save adder A8″ from the next lower order bit column N−1. Those complemented carry bits are received at the input of A8″ after only a single logic delay interval from the instant when the partial products are applied to the first stage of the partial product adder. The sum bits S11, S21 and S31 are received at the input to the carry save adder A6″ after two delay intervals from the instant when the partial product bits are applied to the first stage of the partial product adder. In a similar manner, partial products P10, P11 and P12 are received by the carry save adder A4″ which produces the complemented carry $\overline{C41}$ and the true sum S41. Partial products P13, P14 and P15 are applied to the input of the carry save adder A5″, producing the complemented carry $\overline{C51}$ and the true sum S51. S41, S51 and the highest order partial product P16 are applied to the inputs of the carry save adder A7″. The carry save adders A1″, A2″, A3″, A4″ and A5″ constitute the first stage of the partial product adder in FIG. 8.

The second stage of the partial product adder in FIG. 8 contains the carry save adders A6″, A7″, A8″ and A9″. The carry save adder A9″ receives the two complemented carry bits $\overline{C40}$ and $\overline{C50}$ from the next lower order bit column N−1 and uses a single exclusive OR logic function to produce the complemented sum $\overline{S91}$. A true carry C91 is produced by the carry save adder A9″ since both of the carry bits $\overline{C40}$ and $\overline{C50}$ input to a 9″ were complement value carries. The carry generation circuit for the carry save adder A9″ is a two input NAND logic function.

The sum output S61 from the carry save adder A6″ and the sum output S71 from the carry save adder A7″ are produced after four delay intervals from the instant when the partial products were applied to the first stage of the partial product adder. S61 and S71 are then directly applied to the fourth stage adder A12″, bypassing the third stage of the partial product adder, in accordance with the invention. The third stage of the partial product adder consists of the carry save adders A10″ and A11″ which receive operands suffering shorter delays in the preceding stages. The sum bit $\overline{S81}$ output from the carry save adder A8″ is applied to the input of the carry save adder A10″ after three delay intervals from the instant when the partial products were applied to the first stage of the partial product adder. The complemented carry bit $\overline{C60}$ and $\overline{C70}$ arrive at the input to the carry save adder A10″ three delay intervals after the instant when the partial products were applied to the first stage of the partial product adder. The sum bit $\overline{S101}$ is output from the carry save adder A10″ and applied to the input of the fourth stage carry save adder A13″ after five delay intervals from the instant when the partial products were input to the partial product adder. In a similar manner, the sum bit $\overline{S111}$ is output from the third stage carry save adder A11″ five delay intervals after the instant of application of the partial products to the first stage of the partial product adder.

The carry bit $\overline{C110}$ is also applied to the input of the fourth stage carry save adder A13″ five delay intervals after the instant of application of the partial products to the first stage. Thus, the sum bit $\overline{S131}$ is output from the carry save adder A13″ seven delay intervals after the instant of application of the partial products to the first stage. This can be compared to the six delay intervals suffered by the sum S121 which is a true sum output by the carry save adder A12″ in the fourth stage. This allows another stage skipping operation to take place, so that the sum S131 output from the fourth stage carry save adder A13″, can be directly applied to the inputs of the sixth stage carry save adder A15″ while the true sum S121 output from the fourth stage carry save adder A12″, which has suffered six delay intervals, is applied to the input of the fifth stage carry save adder A14″, along with the carry bits C120 which has suffered five delay intervals and the true carry C130 which has suffered six delay intervals. The carry save adder A14″ produces a sum bit S141 which has been delayed by eight delay intervals from the instant of application of the partial products to the first stage of the partial product adder. Thus, a second stage skipping operation has been carried out for the 16 bit partial product adder.

Finally, the complemented sum bit $\overline{S141}$, the complemented sum bit $\overline{S131}$, and the complemented carry bit $\overline{C140}$ are applied to the input of the carry save adder A15″. The complemented carry $\overline{C140}$ has been delayed by seven delay intervals from the instant of application of the partial product to the first stage. The resultant sum bit S151 is output from the carry save adder A15″ ten delay intervals after the instant of application of the partial products to the first stage. The resultant carry bit C151 is output from the carry save adder A15″ nine delay intervals after the instant of application of the partial products to the first stage. This can be compared to the 12 delay intervals which would have been required in a conventionally organized partial product adder for a 16 bit multiplier.

The resultant sum bit S15 and carry bit C15 are then added in the conventional manner in a carry propagate adder to produce the final product of the 16 partial products P1 through P16.

Thus it is seen that the principle of using the complement carry output from the carry save adders in the partial product adder to allow the skipping of some of the stages in the partial product adder tree, provides a significant savings in time and circuits for carrying out partial product addition operations in a multiplier.

TABLE 1

| Section | 1 Circuit | 2 Input Data | 3 Value | | | 4 Output Data | 5 Value | | | |
|---|---|---|---|---|---|---|---|---|---|---|
| 1 | A1 | P1 | | | 0001 | 0001 S1 | | 00 | 0001 | 0001 |
| | | P2 | | 0 | 0000 | 0000 C1 NOT | 1111 | 1111 | 1111 | 1111 |
| | | P3 | | 00 | 0000 | 0000 | | | | |
| | A2 | P4 | | 000 | 1000 | 1000 S2 | | 0 0000 | 1000 | 1000 |
| | | P5 | | 0000 | 0000 | 0000 C2 NOT | 1111 | 1111 | 1111 | 1111 |
| | | P6 | 0 | 0000 | 0000 | 0000 | | | | |
| | A3 | P7 | 00 | 0000 | 0000 | 0000 S3 | 000 | 0000 | 0000 | 0000 |
| | | P8 | 000 | 0000 | 0000 | 0000 C3 NOT | 1111 | 1111 | 1111 | 1111 |
| 2 | A4 | S1 | | 00 | 0001 | 0001 S4 | 000 | 0000 | 1001 | 1001 |
| | | S2 | 0 | 0000 | 1000 | 1000 C4 NOT | 1111 | 1111 | 1111 | 1111 |
| | | S3 | 000 | 0000 | 0000 | 0000 | | | | |
| | A5 | C1 NOT | 1111 | 1111 | 1111 | 1111 S5 NOT | 1111 | 1111 | 1111 | 1111 |
| | | C2 NOT | 1111 | 1111 | 1111 | 1111 C5 | 0000 | 0000 | 0000 | 0000 |
| | | C3 NOT | 1111 | 1111 | 1111 | 1111 | | | | |
| 3 | A6 | S5 NOT | 1111 | 1111 | 1111 | 1111 S6 | 0000 | 0000 | 0000 | 0000 |
| | | C4 NOT | 1111 | 1111 | 1111 | 1111 C6 | 0000 | 0000 | 0000 | 0000 |
| | | C5 | 0000 | 0000 | 0000 | 0000 | | | | |
| 4 | A7 | S4 | 000 | 0000 | 1001 | 1001 S7 | 0000 | 0000 | 1001 | 1001 |
| | | S6 | 0000 | 0000 | 0000 | 0000 C7 NOT | 1111 | 1111 | 1111 | 1111 |
| | | C6 | 0000 | 0000 | 0000 | 0000 | | | | |
| 5 | CPA | S7 | 0000 | 0000 | 1001 | 1001 Result | 0000 | 0000 | 1001 | 1001 |
| | | C7 | 0000 | 0000 | 0000 | 0000 | | | | |

Although a specific embodiment of the invention has been disclosed, it will be understood by those of skill in the art that the foregoing and other changes in form and detail may be made therein without departing from the spirit and the scope of the invention.

Having thus described our invention, what we claim as new, and desire to secure by Letters Patent is:

1. In a multiplier including a partial product adder having a plurality of binary bit columns for adding M partial products, an $N^{th}$ one of said bit columns having an $N^{th}$ bit significance, comprising:

a first carry save adder in a first stage, having three single bit inputs for receiving corresponding bits from a first, a second and a third respective ones of said partial products, a first sum bit output and a first complemented carry bit output, for outputting said first complemented carry bit after a delay interval and for outputting said first sum bit after two of said delay intervals with respect to the instant of receipt of said partial products;

a second carry save adder in said first stage, having three single bit inputs for receiving corresponding bits from a fourth, a fifth and a sixth respective ones of said partial products, a second sum bit output and a second complemented carry bit output, for outputting said second complemented carry bit after said delay interval and for outputting said second sum bit after two of said delay intervals with respect to said instant of receipt of said partial products;

a third carry save adder in said first stage, having three single bit inputs for receiving corresponding bits from at least a seventh and an eighth respective ones of said partial products, a third sum bit output and a third complemented carry bit output, for outputting said third complemented carry bit after said delay interval and for outputting said third sum bit after two of said delay intervals with respect to said instant of receipt of said partial products;

a fourth carry save adder in a second stage following said first stage in said $N^{th}$ bit column, having three single bit inputs for receiving said first, second and third sum bits respectively, a fourth sum bit output and a fourth complemented carry bit output, for outputting said fourth complemented carry bit after three of said delay intervals and for outputting said fourth sum bit after four of said delay intervals with respect to said instant of receipt of said partial products;

a fifth carry save adder in said second stage, having three single bit inputs for receiving complemented carry bits from a first stage of an adjacent one of said plurality of binary bit columns having an $N-1$st bit significance, the received complemented carry bits corresponding to said first, second and third complemented carry bits respectively, said fifth carry save adder having a fifth complemented sum bit output and a fifth carry bit output, for outputting said fifth carry bit after two of said delay intervals and for outputting said fifth complemented sum bit after three of said delay intervals with respect to said instant of receipt of said partial products;

a sixth carry save adder in a third stage following said second stage in said $N^{th}$ bit column, having three single bit inputs for respectively receiving said fifth complemented sum bit and a true and a complemented carry bit from a second stage of said adjacent one of said plurality of binary bit columns having said $N-1$st bit significance, the two received carry bits corresponding to said fourth complemented and fifth true carry bits respectively, said sixth carry save adder having a sixth sum bit output and a carry bit output, for outputting a carry bit after four of said delay intervals and for outputting said sixth sum bit after five of said delay intervals with respect to said instant of receipt of said partial products;

a seventh carry save adder in a later stage following said third stage in said $N^{th}$ bit column, having three single bit inputs, with a first input thereof connected to said fourth sum bit output of said fourth carry save adder, skipping said third stage in said $N^{th}$ bit column, said second input of said seventh adder connected to said sixth sum bit output from said sixth carry save adder in said $N^{th}$ bit column, said third input of said seventh adder receiving a carry bit from a stage following said second stage of said adjacent $N-1$st one of said bit columns, said seventh carry save adder having a seventh sum bit output and a seventh complemented carry bit output, for outputting said seventh complemented carry bit and seventh sum bit, the sum of which is the final product bit for said $N^{th}$ bit column of said multiplier;

whereby said skipping of said third stage increases the speed of operation of the multiplier.

2. The apparatus of claim 1, which further comprises:
said seventh carry save adder being in a fourth stage following said third stage in said $N^{th}$ bit column and having said third input thereof receiving a carry bit from a third stage of said adjacent one of said plurality of binary bit columns having said $N-1$st bit significance, the received carry bit corresponding to said carry bit output from said sixth carry save adder;

whereby at least eight partial products are added in at least an eight bit multiplier.

3. The apparatus of claim 1, wherein said $N^{th}$ bit column includes six sequential stages of said carry save adders and said seventh carry save adder is in the sixth stage of the sequence thereof, so that at least 16 partial products can be added in at least a 16 bit multiplier.

4. In a multiplier including a partial product adder having a plurality of binary bit columns for adding at least 16 partial products, an $N^{th}$ one of said bit columns having an $N^{th}$ bit significance, comprising:

a plurality of carry save adders in a sequence of stages, each said adder having three single bit inputs for receiving corresponding bits of three operands, and two single bit outputs for outputting a carry-type bit after a delay interval and for outputting a sum-type bit after two of said delay intervals with respect to the instant of receipt of said operands;

a first one of said carry save adders in a first stage, for receiving corresponding bits from a first, a second and a third respective ones of said partial products, and outputting a first sum bit output and a first complemented carry bit output;

a second one of said carry save adders in said first stage, for receiving corresponding bits from a fourth, a fifth and a sixth respective ones of said partial products, and outputting a second sum bit output and a second complemented carry bit output;

a third one of said carry save adders in said first stage, for receiving corresponding bits from a seventh, an eighth and a ninth respective ones of said partial products, and outputting a third sum bit output and a third complemented carry bit output;

a fourth one of said carry save adders in said first stage, for receiving corresponding bits from a tenth, an eleventh and a twelfth respective ones of said partial products, and outputting a fourth sum bit output and a fourth complemented carry bit output;

a fifth one of said carry save adders in said first stage, for receiving corresponding bits from a thirteenth, a fourteenth and fifteenth respective ones of said partial products, and outputting a fifth sum bit output and a fifth complemented carry bit output;

a sixth one of said carry save adders in a second stage, following said first stage in said $N^{th}$ bit column, for receiving said first, second and third sum bits respectively, and outputting a sixth sum bit output and a sixth complemented carry bit output;

a seventh one of said carry save adders in said second stage following said first stage in said $N^{th}$ bit column, for receiving said fourth and fifth sum bits respectively and a sixteenth respective one of said partial products, and outputting a seventh sum bit output and a seventh complemented carry bit output;

an eighth one of said carry save adders in said second stage, for receiving complemented carry bits from a first stage of an adjacent one of said plurality of binary bit columns having an N−1st bit significance, the received complemented carry bits corresponding to said first, second and third complemented carry bits respectively, said eighth carry save adder outputting an eighth sum bit output and an eighth complemented carry bit output;

a ninth one of said carry save adders in said second stage, for receiving complemented carry bits from said first stage of said adjacent one of said plurality of binary bit columns having an N−1st bit significance, the received complemented carry bits corresponding to said fourth and fifth complemented carry bits respectively, said ninth carry save adder outputting a ninth sum bit output and a ninth complemented carry bit output;

a tenth one of said carry save adders in a third stage, following said second stage in said $N^{th}$ bit column, for respectively receiving said eighth sum bit and two complemented carry bits from a second stage of said adjacent one of said plurality of binary bit columns having said N−1st bit significance, the received complemented carry bits corresponding to said sixth and seventh complemented carry bits respectively, said tenth carry save adder outputting a tenth sum bit output and a tenth complemented carry bit output;

an eleventh one of said carry save adders in said third stage following said second stage in said $N^{th}$ bit column for respectively receiving said ninth sum bit and two complemented carry bits from said second stage of said adjacent one of said plurality of binary bit columns having said N−1st bit significance, the received complemented carry bits corresponding to said eighth and ninth complemented carry bits respectively, said eleventh carry save adder outputting an eleventh sum bit output and an eleventh complemented carry bit output;

a twelfth one of said carry save adders in a fourth stage following said third stage in said $N^{th}$ bit column, with a first input thereof connected to said sixth sum bit output of said sixth carry save adder, skipping said third stage in said $N^{th}$ bit column, a second input of said twelfth adder connected to said seventh sum bit output from said seventh carry save adder in said $N^{th}$ bit column, skipping said third stage in said $N^{th}$ bit column, skipping said third stage in said $N^{th}$ bit column, a third input of said twelfth adder receiving a complemented carry bit from a third stage following said second stage of said adjacent N−1st one of said bit columns, the received complemented carry bit corresponding to said tenth complemented carry bit, said twelfth carry save adder outputting a twelfth sum bit output and a twelfth complemented carry bit output;

a thirteenth one of said carry save adders in said fourth stage following said third stage in said $N^{th}$ bit column, with a first input thereof connected to said tenth sum bit output of said tenth carry save adder, a second input of said thirteenth adder connected to said eleventh sum bit output from said eleventh carry save adder in said $N^{th}$ bit column, a third input of said thirteenth adder receiving a complemented carry bit from said third stage following said second stage of said adjacent N−1st one of said bit columns, the received complemented carry bit corresponding to said eleventh complemented carry bit, said thirteenth carry save adder outputting a thirteenth sum bit output and a thirteenth complemented carry bit output;

a fourteenth one of said carry save adders in a fifth stage following said fourth stage in said $N^{th}$ bit column, for respectively receiving said twelfth sum bit and two complemented carry bits from a fourth stage of said adjacent one of said plurality of binary bit columns having said N−1st bit significance, the received complemented carry bits corresponding to said twelfth and thirteenth complemented carry bits respectively, said fourteenth carry save adder outputting a fourteenth sum bit output and a fourteenth complemented carry bit output;

a fifteenth one of said carry save adders in a sixth stage following said fifth stage in said $N^{th}$ bit column, with a first input thereof connected to said thirteenth sum bit output of said thirteenth carry save adders, skipping said fifth stage in said $N^{th}$ bit column, a second input of said fifteenth stage connected to said fourteenth sum bit output from said fourteenth carry save adder in said $N^{th}$ bit column, a third input of said fifteenth adder receiving a complemented carry bit from a fifth stage following said fourth stage of said adjacent N−1st one of said bit columns, said fifteenth carry save adder outputting a fifteenth sum bit output and a fifteenth complemented carry bit output, the sum of which is the final product bit for said $N^{th}$ bit column of said multiplier;

whereby said skipping of said third stage by said sixth and seventh sums and said skipping of said fifth stage by said thirteenth sum increases the speed of operation of the multiplier.

5. In a multiplier including a partial product adder having a plurality of binary bit columns for adding M partial products, an $N^{th}$ one of said bit columns having an $N^{th}$ bit significance, a method for adding said partial products, comprising steps of:

adding in a first carry save adder in a first stage, corresponding bits from a first, a second and a third respective ones of said partial products, and outputting a first complemented carry bit after a delay interval and for outputting a first sum bit after two of said delay intervals with respect to the instant of receipt of said partial products;

adding in a second carry save adder in said first stage, corresponding bits from a fourth, a fifth and a sixth respective ones of said partial products, and outputting a second complemented carry bit after said delay interval and for outputting a second sum bit after two of said delay intervals with respect to said instant of receipt of said partial products;

adding in a third carry save adder in said first stage, corresponding bits from at least a seventh and an eighth respective ones of said partial products, and outputting a third complemented carry bit after said delay interval and for outputting a third sum bit after two of said delay intervals with respect to said instant of receipt of said partial products;

adding in a fourth carry save adder in a second stage following said first stage in said $N^{th}$ bit column, said first, second and third sum bits respectively, and outputting a fourth complemented carry bit after three of said delay intervals and for outputting a fourth sum bit after four of said delay intervals with respect to said instant of receipt of said partial products;

adding in a fifth carry save adder in said second stage, complemented carry bits from a first stage of an adjacent one of said plurality of binary bit columns having an N−1st bit significance, the received complemented carry bits corresponding to said first, second and third complemented carry bits respectively, and outputting a fifth carry bit after two of said delay intervals and for outputting a fifth complemented sum bit after three of said delay intervals with respect to said instant of receipt of said partial products;

adding in a sixth carry save adder in a third stage following said second stage in said $N^{th}$ bit column, said fifth complemented sum bit and two carry bits from a second stage of said adjacent one of said plurality of binary bit columns having said N−1st bit significance, the received carry bits corresponding to said fourth complemented carry bits and fifth true carry bits respectively, and outputting a carry bit after four of said delay intervals and for outputting a sixth sum bit after five of said delay intervals with respect to said instant of receipt of said partial products;

adding in a seventh carry save adder in a later stage following said third stage in said $N^{th}$ bit column, said fourth sum bit output from said fourth carry save adder, skipping said third stage in said $N^{th}$ bit column, said sixth sum bit output from said sixth carry save adder in said $N^{th}$ bit column, and a carry bit from a stage following said second stage of said adjacent N−1st one of said bit columns, and outputting a seventh complemented carry bit and a seventh sum bit, the sum of which is the final product bit for said $N^{th}$ bit column of said multiplier;

whereby said skipping of said third stage increases the speed of operation of the multiplier.

* * * * *

UNITED STATES PATENT AND TRADEMARK OFFICE
CERTIFICATE OF CORRECTION

PATENT NO. : 4,556,948

DATED : December 3, 1985

INVENTOR(S) : Brian R. Mercy

It is certified that error appears in the above-identified patent and that said Letters Patent is hereby corrected as shown below:

Claim 4, Col. 13, line 51 - delete the words "skipping said";

Claim 4, Col. 13, line 52 - delete the phrase "third stage in said Nth bit column,";

Claim 4, Col. 14, line 23 - delete the word "stage" and insert the word --adder--.

Signed and Sealed this

Eleventh Day of March 1986

[SEAL]

Attest:

DONALD J. QUIGG

Attesting Officer

Commissioner of Patents and Trademarks